United States Patent
Ohara et al.

(10) Patent No.: US 9,083,777 B2
(45) Date of Patent: Jul. 14, 2015

(54) IMAGE COMMUNICATION APPARATUS AND SIGNAL PROCESSING UNIT

(71) Applicant: CANON KABUSHIKI KAISHA, Tokyo (JP)

(72) Inventors: Eiji Ohara, Kawasaki (JP); Shigeru Koizumi, Tokyo (JP); Daisuke Suga, Kawasaki (JP); Michio Fukushima, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/311,975

(22) Filed: Jun. 23, 2014

(65) Prior Publication Data
US 2015/0003598 A1    Jan. 1, 2015

(30) Foreign Application Priority Data
Jun. 26, 2013 (JP) ................................. 2013-134204

(51) Int. Cl.
*H04M 11/00*    (2006.01)
*H04M 7/00*    (2006.01)
*H04N 1/00*    (2006.01)

(52) U.S. Cl.
CPC ......... *H04M 7/0024* (2013.01); *H04N 1/00312* (2013.01)

(58) Field of Classification Search
CPC . H04L 12/66; H04L 65/1006; H04L 65/1069; H04M 2201/52; H04M 7/006; H04N 1/00209; H04N 1/0022; H04N 1/32667; H04N 1/32797; H04N 1/33338; H04N 2201/001
USPC ........... 379/100.01, 100.16, 100.15; 358/434, 358/438, 442, 443
See application file for complete search history.

(56) References Cited

U.S. PATENT DOCUMENTS

| 2002/0034284 A1* | 3/2002 | Kang ........................ 379/100.06 |
| 2014/0168703 A1* | 6/2014 | Nakagawa, Kaori ........ 358/1.15 |

FOREIGN PATENT DOCUMENTS

JP    2005-202643 A    7/2005

* cited by examiner

*Primary Examiner* — Stella Woo
(74) *Attorney, Agent, or Firm* — Rossi, Kimms & McDowell LLP

(57) ABSTRACT

This image communication apparatus receives a digital signal having a voice bandwidth from an external apparatus capable of communicating through a network, and processes the received digital signal by means of a signal processing unit. If it is determined that the digital signal includes a CNG signal, the image communication apparatus determines that the digital signal is a facsimile signal received as deemed voice, and executes facsimile reception according to the T.30 standard. If it is determined that the digital signal does not include a CNG signal, the image communication apparatus determines that the digital signal is a voice signal, and executes a voice call.

8 Claims, 7 Drawing Sheets

IMAGE COMMUNICATION APPARATUS AND SIGNAL PROCESSING UNIT

BACKGROUND OF THE INVENTION

1. Field of the Invention

The present invention relates to an image communication apparatus equipped with an IP facsimile function that has a plurality of synchronous serial interfaces, as well as a signal processing unit, and more particularly to a transfer timing of a PCM (Pulse Code Modulation) interface that transfers PCM data.

2. Description of the Related Art

In recent years, conventional circuit-switched telephone networks are being replaced with networks based on IP (Internet Protocol) technology, and technology that provides services over a LAN or a Next Generation Network (NGN) is in widespread use. Here, the term "NGN" refers to an IP network in which the network itself is equipped with a bandwidth guarantee function and a security function to integrally realize a telephone service, a video communication service, a data communication service, and other such services.

Further, SIP (Session Initiation Protocol) that is a protocol with which a virtual session is established between communication devices on such a LAN or NGN and which guarantees services while the session is established is in widespread use. Various kinds of services have been proposed that use a protocol such as IP or VOIP (Voice Over IP) to allow a telephone call or image communication to be performed, or both a telephone call and image communication to be simultaneously performed, at a communication device at which a session was established using the SIP. Further, with respect to such image communication, facsimile communication based on a digital facsimile protocol described in ITU-T Recommendation T.38 and facsimile communication based on a digital facsimile protocol described in ITU-T Recommendation T.30 (T.30 facsimile communication by VOIP deemed voice) and the like are also available.

In such voice communication or image communication, the PCM data is transferred to respective processing units through a plurality of PCM interfaces inside an image communication apparatus. For example, Japanese Patent Laid-Open No. 2005-202643 discloses technology that uses a synchronous serial bus that includes a data signal line and a synchronous signal line, in which one party in a transfer operation is caused to operate as a master and another party is caused to operate as a slave. Further, in the case of selectively switching a plurality of slaves to connect with a master and performing PCM data transfers with respect to the plurality of slave also, similarly to the foregoing technology, one party in the transfer operation is caused to operate as a master and another party is caused to operate as a slave, and transmission and reception of bidirectional data is performed based on the transfer timing of the respective masters.

However, the following problem exists in the above described conventional technology. At a plurality of different PCM interfaces, communication between masters and slaves is performed using a different transfer timing for each master. Consequently, since a series of processing operations is performed in a distributed manner, in some cases the same data is transferred between the respective PCM interfaces. In such a case, it is necessary to transfer the same data at PCM transfer timings that are different at the respective masters of the plurality of PCM interfaces, and therefore the control is complicated and such a situation leads to a decrease in performance due to an increase in the control load.

According to the above described control, by storing transfer data in a memory of the like, read operations are performed so as to avoid conflicts arising between the transfer timings of different asynchronous masters, and the control is executed so that the same data is supplied between the respective PCM interfaces. In addition, while the same data is being transferred among the respective PCM interfaces, it is necessary to perform control to prevent writing of the next transfer data in order to protect the current transfer data or the like, and there is thus the problem that the control load increases.

SUMMARY OF THE INVENTION

The present invention enables realization of a mechanism that, in the case of transferring the same data to a plurality of PCM interfaces, simplifies the circuit configuration and reduces a control load when transferring PCM data.

One aspect of the present invention provides a signal processing unit configured to process a digital signal having a voice bandwidth, comprising: a modem processing unit configured to process an image signal; a voice processing unit configured to process a voice signal; a first interface conversion unit that is connected to the modem processing unit through a first synchronous serial interface, and is configured to make a system bus and the first synchronous serial interface to the modem processing unit compatible with each other; and a second interface conversion unit that is connected to the voice processing unit through a second synchronous serial interface, and is configured to make a system bus and the second synchronous serial interface to the voice processing unit compatible with each other; wherein: the first synchronous serial interface performs a data transfer by adopting the modem processing unit that is connected to one end thereof as a master and adopting the first interface conversion unit that is connected to another end thereof as a slave; and the second synchronous serial interface adopts both of the voice processing unit and the second interface conversion unit that are connected to one end and another end thereof as a slave, and performs a data transfer to the two slaves at a transfer timing that is identical to a transfer timing of the master.

Another aspect of the present invention provides an image communication apparatus, comprising: a reception unit configured to receive a digital signal having a voice bandwidth from an external apparatus that is capable of communicating through a network; and a signal processing unit that is configured to process the digital signal that is received by the reception unit.

Further features of the present invention will be apparent, from the following description of exemplary embodiments with reference to the attached drawings.

DESCRIPTION OF THE EMBODIMENTS

Figure 1:
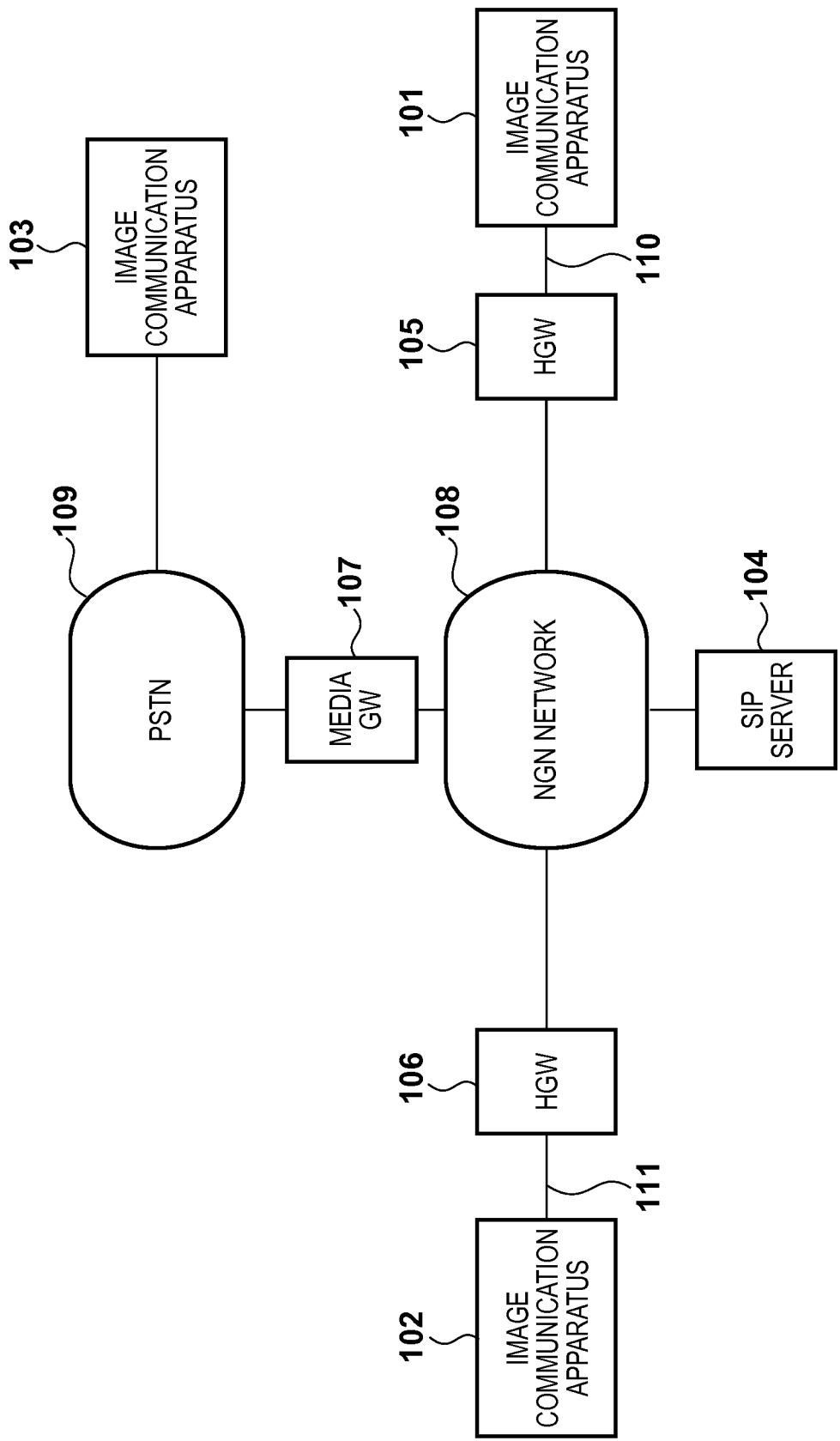
FIG. 1 is a view illustrating a configuration of a network system according to an embodiment of the present invention.

Embodiments of the present invention will now foe described in detail with reference to the drawings. It should foe noted that the relative arrangement of the components, the numerical expressions and numerical values set forth in these embodiments do not limit the scope of the present invention unless it is specifically stated otherwise.

<Configuration of Network System>

An embodiment of the present invention will be described hereunder with reference to FIGS. 1 to 7. First, the configuration of a network system capable of applying the present embodiment will be described with reference to FIG. 1.

A SIP server 104, home gateways 105 and 106, and a media gateway 107 are connected on an NGN network 108. The SIP server 104 provides SIP (Session Initiation Protocol) services, such as conversion between a telephone number and an IP address, in order to perform a call connection process for an IP telephone service or IP facsimile communication. Image communication apparatuses 101, 102, and 103 are communicably connected to each other through the aforementioned relay apparatuses.

The home gateways 105 and 106 are connected to the NGN network 108, and to the image communication apparatuses 101 and 102, respectively, so as to relay data therebetween. The image communication apparatuses 101 and 102 are also connected to the home gateways 105 and 106 via CSMA/CD interfaces 110 and 111, respectively. These devices are interface devices for performing facsimile communication according to a digital facsimile protocol specified in ITU-T Recommendation T.38, and facsimile communication according to a digital facsimile protocol specified in ITU-T Recommendation T.30 (T.30 facsimile communication by VOIP deemed voice), respectively. The term "VOIP" is an abbreviation of "Voice over Internet Protocol". The image communication apparatuses 101 and 102 perform call connections in accordance with SIP and ITU-T standard T.38 communication via the NGN network 108. Note that an SIP server 104 that is defined in the IETF RFC 3261 Session Initiation Protocol is utilized for the call connections in accordance with SIP.

The media gateway 107 is provided by a telecommunications carrier or a network service provider so as to connect between the NGN network 108 and the PSTN 109. The media gateway 107 performs digital-analog conversion of signals between a voice signal and IP packets, and also controls initiation of a call to a subscriber terminal (voice terminal or the like) connected to the PSTN 109. The image communication apparatus 103 is a G3 analog facsimile apparatus connected to the PSTN 109, and performs facsimile communication according to an analog facsimile protocol defined in ITU-T Recommendation T.30.

<Configuration of Image Communication Apparatus>

Figure 2:
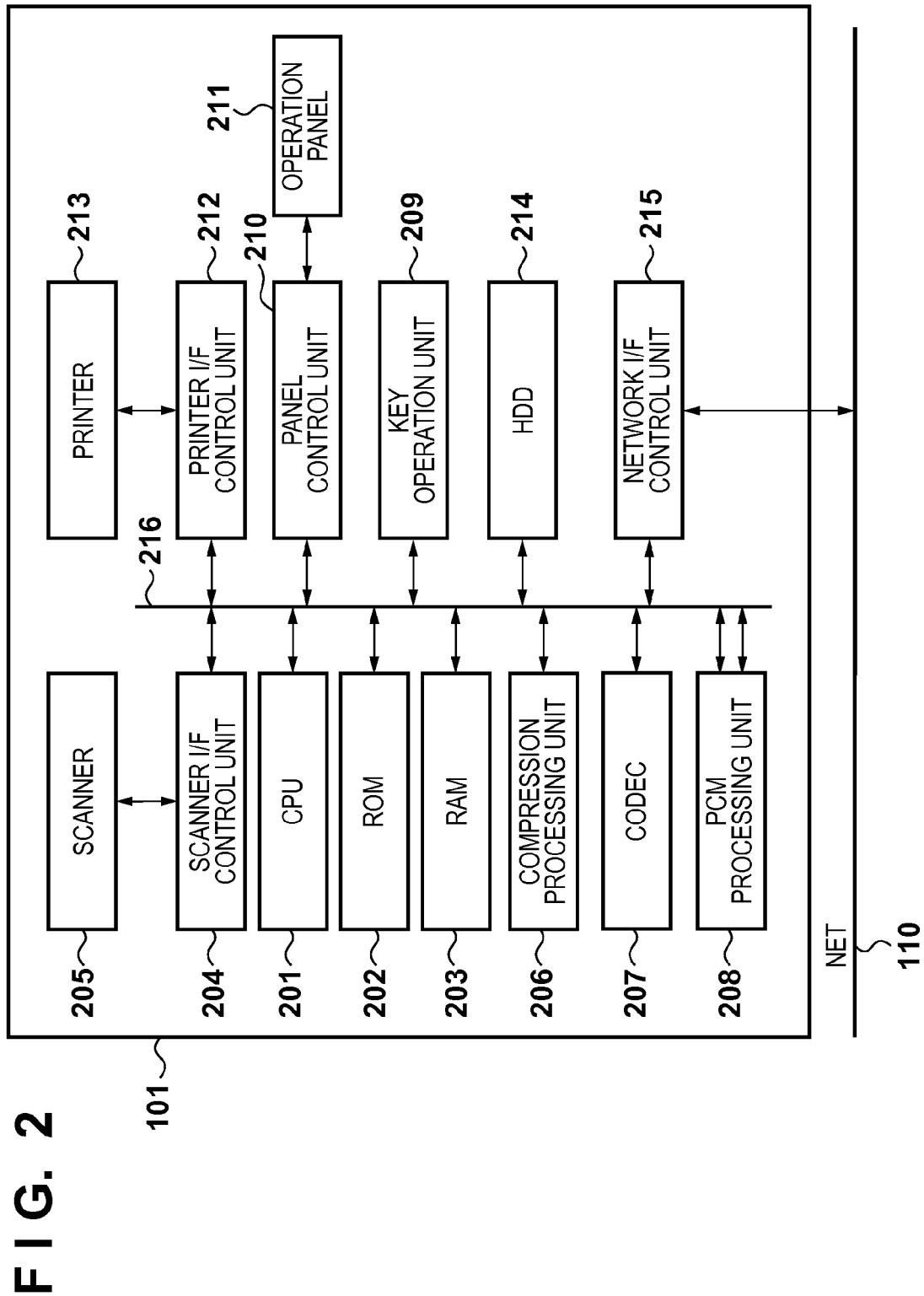
FIG. 2 is a block diagram illustrating a hardware configuration of an image communication apparatus that is equipped with a function according to the embodiment.

Next, the hardware configuration of the image communication apparatus 101 according to the present embodiment will be described referring to FIG. 2. In FIG. 2, a CPU 201 performs overall control of the image communication apparatus according to a program stored in a ROM 202 that is a read only memory. The CPU 201 also performs TCP/IP protocol processing, and the assembly of image data into TCP/IP frames is performed according to control of the CPU 201. A RAM 203 is a random access memory that is used as a work memory when executing a program, and is also used for buffering when transmitting and receiving image data.

A scanner I/F control unit 204 controls a scanner 205. An image obtained by scanning an original is converted to digital data by the scanner I/F control unit 204. The converted digital data is transferred to the RAM 203 under the control of the CPU 201, and is then transmitted or is recorded and output, as described later. A compression processing unit 206 is an encoding/decoding processing unit that adopts an MH, MR, MMR, or JBIG compression method. When image data is to be transmitted, the compression processing unit 206 encodes the scanned image data for data compression, whereas when encoded image data is received, the compression processing unit 206 decodes the received image data.

A CODEC 207 is assumed to support at least encoding and decoding that is required for transmitting and receiving an Internet facsimile signal according to the T.38 standard. A PCM (Pulse Code Modulation) processing unit 208 supports encoding and decoding according to a VoIP method for voice signals or facsimile signals that are transmitted and received as deemed voice. The PCM processing unit 208 is one example of a signal processing unit. According to the present embodiment, when a signal is received from an external apparatus such as the image communication apparatus 102, the presence or absence of a CNG (calling) signal is detected with the PCM processing unit 208 to determine whether the received signal is a voice signal or a facsimile signal (image signal) that is transmitted and received as deemed voice.

A key operation unit 209 is constituted by a dial and operation buttons that are operated for facsimile transmission and reception or the like. A user uses the key operation unit 209 to issue operation instructions. A panel control unit 210 controls an operation panel 211 that, displays various kinds of information and accepts the input of instructions by the user. A printer I/F control unit 212 controls a printer 213 that is configured to print according to an arbitrary recording method such as an electrophotographic method or an Inkjet method. The printer I/F control unit 212 converts image data that was received (or inputted by another method) into raster data for printing, and causes the raster data for printing to be printed and output. A HDD 214 is a hard disk drive that is used to store print data and various other kinds of data.

A network I/F control unit 215 is a LAN controller which performs transmission and reception of data to and from the home gateway 105 (106) via the CSMA/CD interface 110 (111). When data that to be transmitted is transferred to the network I/F control unit 215, the network I/F control unit 215 adds a MAC (Media Access Control) frame header and an FCS (Frame Check Sequence) and the like thereto, and transmits the resulting data to the CSMA/CD interface 110. A bus 216 is a system bus that is connected to the CPU 201, the RAM 203, the compression processing unit 206, the CODEC 207, the PCM processing unit 208, the network I/F control unit 215 and the like, and is used for sending and receiving control signals from the CPU 201 and data signals between the respective devices.

<Configuration of PCM Processing Unit>

Figure 3:
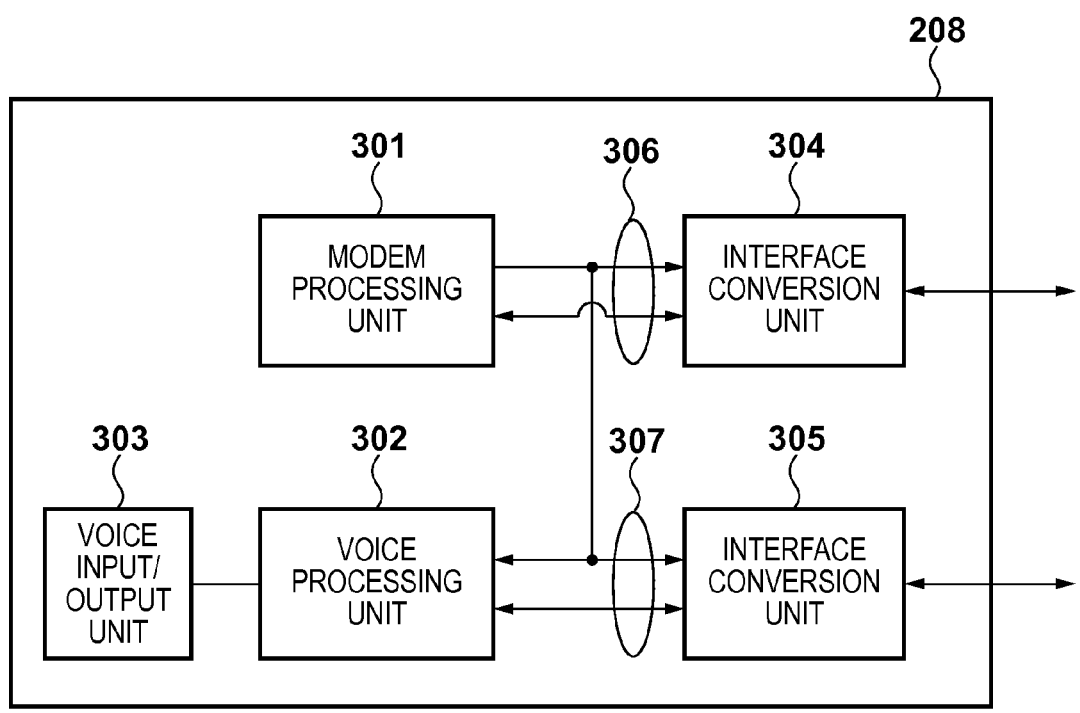
FIG. 3 is a detailed block diagram of a PCM processing unit according to the embodiment.

Next, the detailed configuration of the PCM processing unit 208 is described referring to FIG. 3. The PCM processing unit 208 includes a modem processing unit 301, a voice processing unit 302, a voice input/output, unit 303, and interface conversion units 304 and 305. As described above, the PCM processing unit 208 receives and transmits digital signals having a voice bandwidth. As shown in FIG. 3, the modem processing unit 301 and the interface conversion unit (first interface conversion unit) 304 are connected through a PCM interface (first synchronous serial interface) 306. Further, the voice processing unit 302 and the interface conversion unit (second interface conversion unit) 305 are connected through a PCM interface (second synchronous serial interface) 307.

When transmitting data, the modem processing unit 301 modulates encoded image data to convert the image data into PCM data that is a digital signal having a voice bandwidth, whereas when receiving data, the modem processing unit 301 demodulates the received PCM data that is a digital signal having a voice bandwidth, and outputs the encoded image data. The voice input/output unit 303 is constituted by a telephone or handset configured to perform voice input and output.

When transmitting data, the voice processing unit 302 converts an analog voice signal from the voice input/output unit 303 to PCM data that is a digital signal having a voice bandwidth, whereas when receiving data, the voice processing unit 302 converts the received PCM data that is a digital signal having a voice bandwidth to an analog voice signal and outputs the analog voice signal to the voice input/output unit 303. These digital signals having a voice bandwidth are PCM data that supports encoding and decoding according to a VoIP method for voice signals or facsimile signals that are transmitted and received as deemed voice.

The interface conversion units 304 and 305 perform interface conversion to make the bus 216 that is the system bus and the PCM interfaces 306 and 307 of the modem processing unit 301 and the voice processing unit 302 compatible with each other and carry out the transmission and reception of data.

Note that, according to the present embodiment, when a digital signal having a voice bandwidth is received, the PCM processing unit 208 determines whether the received signal is a voice signal or a facsimile signal that is transmitted and received as deemed voice based on whether or not a CNG signal is included therein. At such time, the received digital signal having a voice bandwidth is input, to the voice processing unit 302 through the interface conversion unit 305 and the PCM interface 307. Simultaneously, the digital signal is input to the modem processing unit 301 through the PCM interface 306, and the modem processing unit 301 determines whether or not the digital signal includes a CNG signal. If the digital signal includes a CNG signal, it is determined that the digital signal is a facsimile signal that was transmitted and received as deemed voice, and the digital signal is processed at the modem processing unit 301. That is, in this case, it is necessary to supply the same signal to a plurality of PCM interfaces, and conventionally this operation has required complicated control. However, a feature of the present invention is that such complicated control is not performed and the control load is reduced. This feature is described in detail hereunder.

<Timing Chart>

Figure 4:
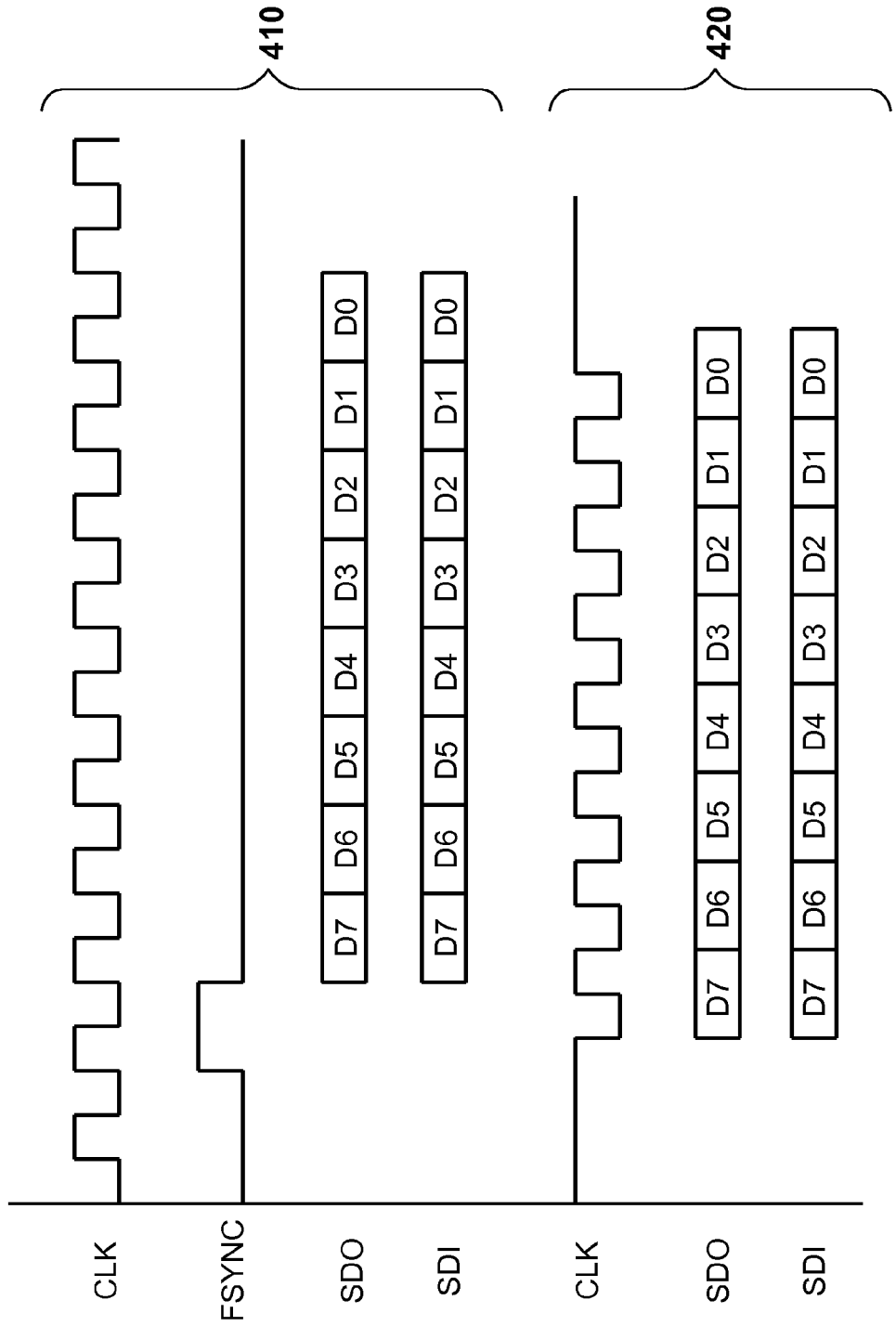
FIG. 4 is a timing chart of a PCM interface according to the embodiment.

Next, a timing chart of a PCM interface is described referring to FIG. 4. The PCM interface is an interface for performing a synchronous serial transfer, and is described taking timing charts 410 and 420 as examples.

The timing chart 410 shows two timing signals, namely, a clock CLK and a synchronization signal FSYNC, and two data signals, namely, a data input SDI and a data output SDO. That is, the PCM interface is constituted by a total of four signal lines.

At the PCM interface 306, a device at one end of the PCM interface is a master and a device at the other end is a slave. The clock CLK and synchronization signal FSYNC are timing signals that, the master supplies to the slave, and the master decides the transfer timing of the PCM interface. In this case, the timing chart 410 indicates that the data signal starts from the rising edge of the second clock CLK from the rising edge of the synchronization signal FSYNC. Thereafter, a consecutive, for example, eight data inputs SDI and data outputs SDO constitute a valid data signal.

In this connection, the PCM interface is not limited to a case in which one device is a master and another device is a slave. It is possible for the PCM interface 307 to supply the timing signals of the clock CLK and the synchronization signal FSYNC used at the PCM interface 306 to devices at both ends of the PCM interface and adopt both devices as slaves to perform the transfer of data signals. In this case, since the PCM interfaces 306 and 307 are caused to operate with the same timing signals, if a case arises in which, for instance, the same data signal is transferred, because the PCM interfaces 306 and 307 are synchronized, the transfer operations can be performed without giving particular consideration to the timing.

The timing chart 420 shows one timing signal, namely, a clock CLK, and two data signals, namely, a data input SDI and a data output SDO. That is, the PCM interface is constituted by a total of three signal lines.

At the PCM interface 306, a device at one end of the PCM interface is a master and a device at the other end is a slave. The clock CLK is a timing signal that the master supplies to the slave, and the master decides the transfer timing of the PCM interface. In this case, the timing chart 420 indicates that the data signal starts from the initial falling edge at which the clock CLK changes. Thereafter, a consecutive, for example, eight data inputs SDI and data outputs SDO constitute a valid data signal. In other words, the PCM interface 306 can perform a data transfer in which the modem processing unit 301 connected to one end thereof is taken as the master and the interface conversion unit 304 connected to the other end thereof is taken as the slave.

In this case also, the PCM interface is not limited to a case in which one device is a master and another device is a slave. It is possible for the PCM interface 307 to supply the timing signal of a clock CLK that is used at the PCM interface 306 to devices at both ends of the PCM interface and adopt both devices as slaves to perform the transfer of data signals. That is, the PCM interface 307 can adopt both the voice processing unit 302 that is connected to one end thereof and the interface conversion unit 305 that is connected to the other end thereof as slaves, and perform data transfers to both of the slaves at the same transfer timing as the master that is the aforementioned modem processing unit 301.

The PCM interfaces 306 and 307 are not limited to the above described interfaces, and may be a common synchronous serial interface. For example, the interfaces may be synchronous serial transfer interfaces having a chip select CS instead of the synchronization signal FSYNC, or may be synchronous serial transfer interfaces according to TDM (Time Division Multiplexing) that perform a plurality of data transfers by time division. Further, the interface conversion units 304 and 305 are not limited to units that, perform conversion with respect, to the bus 216 that is a system bus, and may perform conversion for other interfaces. For example, the interface conversion units 304 and 305 may be units that convert an asynchronous serial interface such as a UART (Universal Asynchronous Receiver Transmitter) that performs asynchronous serial transfers that is a general purpose interface of the CPU 201.

<Processing Flow>

Figure 5:
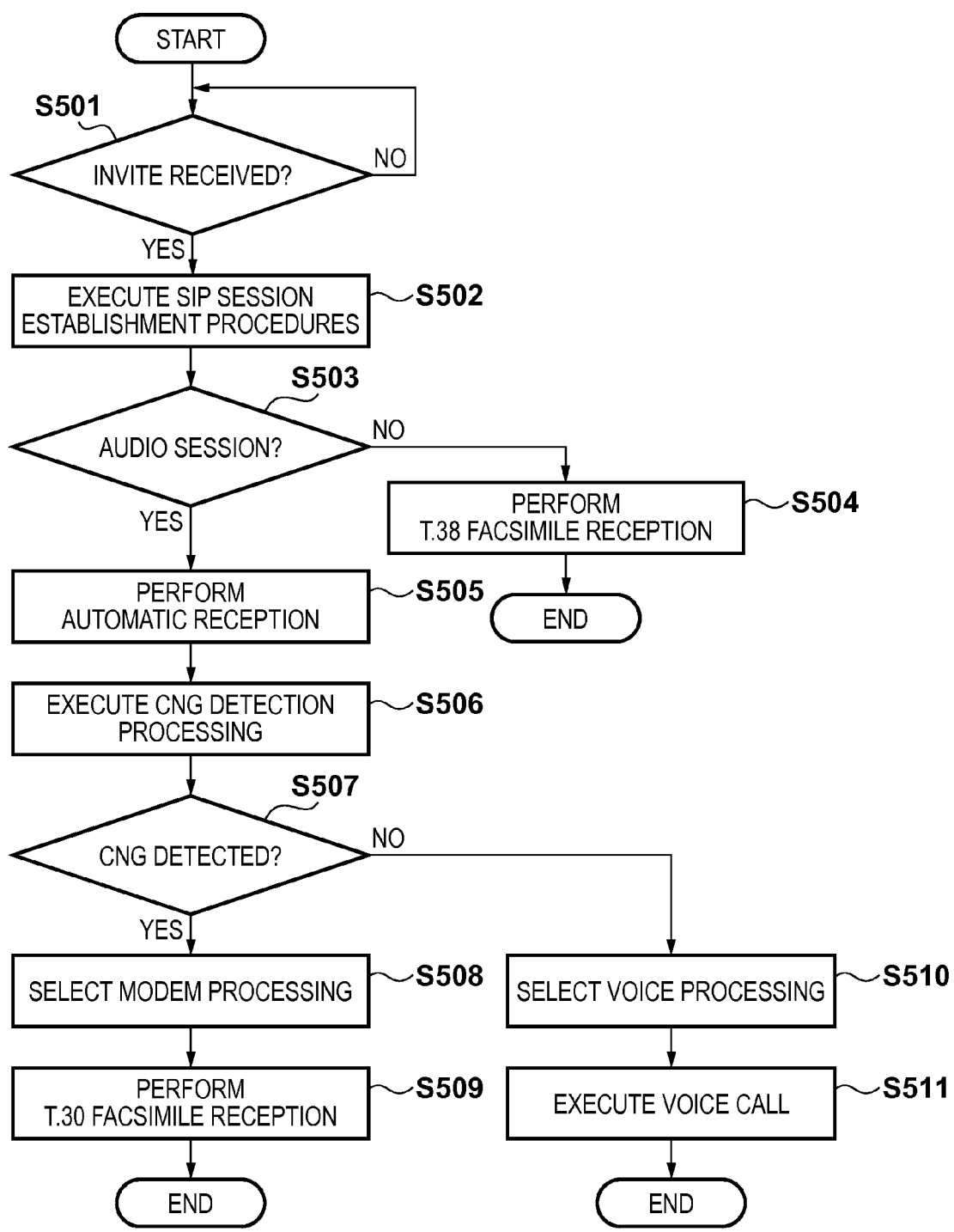
FIG. 5 is a flowchart illustrating a processing flow according to the embodiment.

Next, a processing flow of the embodiment of the present invention is described referring to FIG. 5. In this case, a processing flow is described that takes as an example an automatic reception operation (FAX/TEL switching operation) that, by detecting the presence/absence of a CNG (Calling) signal, automatically distinguishes whether an incoming call signal of an incoming call terminal is a voice signal based on a telephone call or a facsimile signal that is received as deemed voice. Note that, the processing flow described below is implemented by the CPU 201 of the image communication apparatus 101 reading out a control program that is stored in advance in the ROM 202 or the HDD 214 or the like and loading the control program into the RAM 203 and executing the control program.

First, in S501, the CPU 201 determines whether or not an incoming call signal was received at the incoming call terminal. If an incoming call signal was not received (No in S501), the processing of S501 is periodically repeated. On the other hand, if an incoming call signal was received at the incoming call terminal, that is, if a SIP session establishment request (INVITE) is transmitted to the incoming call terminal from an outgoing call terminal (Yes in S501), the CPU 201 proceeds to S502.

In S502, the CPU 201 establishes an SIP session by means of an SIP function with the outgoing call terminal, and starts a connection operation. When establishing a SIP session, the outgoing call terminal transmits a SIP session establishment request (INVITE) to the incoming call terminal, and the incoming call terminal that receives the INVITE transmits a success response to the outgoing call terminal. Upon receipt, of the success response, the outgoing call terminal transmits an ACK message to the incoming call terminal. This procedure establishes the SIP session. Further, with respect to the media that is utilized in the SIP session, the outgoing call side and incoming call side exchange (SDP negotiation) SDP (Session Description Protocol) messages describing the desired media to foe used for each other and a port number, for receiving the media or the like to thereby determine the parameters of the session.

Figure 6:
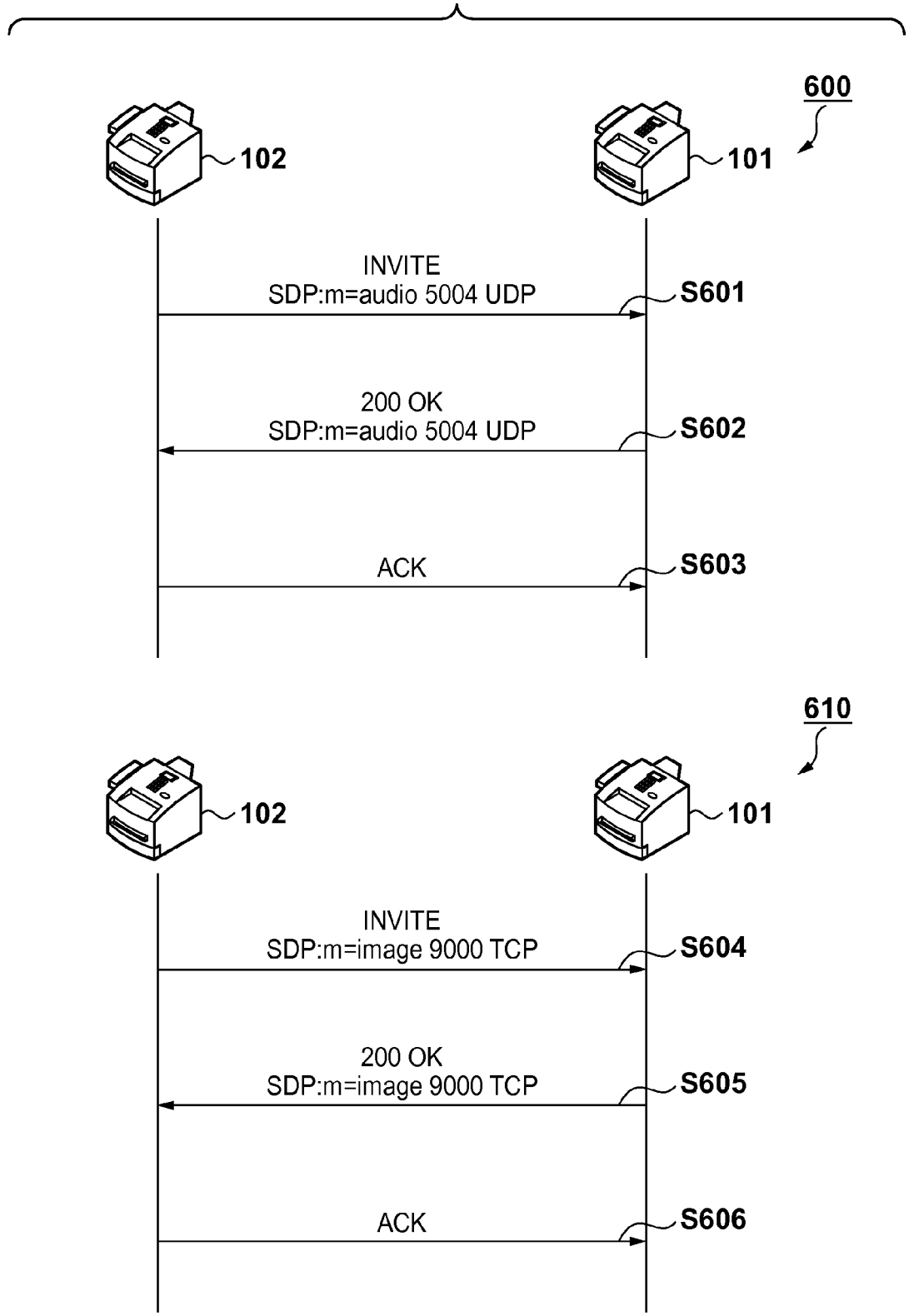
FIG. 6 is a view illustrating sequences carried out when establishing a SIP session according to the embodiment.

The sequence when establishing a SIP session will now foe described referring to FIG. 6. A sequence 600 in FIG. 6 illustrates a sequence when the image communication apparatus (external apparatus) 102 of the present embodiment desires to establish a SIP session and therefore transmits a SIP connection request message (INVITE) that includes an offer SDP to the image communication apparatus 101.

In S601, the image communication apparatus 102 transmits the INVITE message to the image communication apparatus 101. The INVITE message includes an SDP describing information on media that the image communication apparatus 102 wishes to utilize in the SIP session and a reception port number. In this case, with the object, of establishing a telephone call, the SDP describes the information "m=audio 5004 UDP" as a description that, proposes establishing a SIP session for performing data communication in which the media type is "audio" (voice) and in which the UDP port number 5004 is used.

In S602, upon receiving the INVITE message that is addressed to itself, the image communication apparatus 101 checks the offer SDP included in the INVITE message, and if the SDP describes media information that is compatible with the image communication apparatus 101, the image communication apparatus 101 transmits a 200 OK message. The 200 OK message includes an SDP that describes media information that is to be accepted by the image communication apparatus 101 and a reception port number. According to the present embodiment, by describing m=audio 5004 UDP, the SDP unit, that the image communication apparatus 101 agrees to establishing the SIP session for performing data communication in which the media type is "audio" and in which the UDP port-number 5004 is used as a reception port.

In S603, upon receiving the 200 OK message, the image communication apparatus 102 transmits an ACK message indicating that the image communication apparatus 102 has received the 200 OK message. This establishes the SIP session for realizing data communication of the media information agreed by the two parties between the image communication apparatus 102 and the image communication apparatus 101.

It is also possible to establish a session to communicate data for a media type other than the aforementioned audio data. A sequence 610 in FIG. 6 illustrates a sequence in a case where the image communication apparatus 102 of the present embodiment desires to establish a different SIP session. In this case, the image communication apparatus 102 transmits a SIP connection request message (INVITE) that includes an offer SDP to the image communication apparatus 101.

In S604, the image communication apparatus 102 transmits an INVITE message to the image communication apparatus 101. The INVITE message includes an SDP describing information on media that the image communication apparatus 102 wishes to utilize in the SIP session and a reception port number. In this case, with the object of performing image communication, the SDP describes the information "m=image 9000 TCP" as a description that proposes establishing a SIP session for performing data communication in which the media typo is "image" and in which the TCP port, number 9000 is used.

In S605, upon receiving the INVITE message that is addressed to itself, the image communication apparatus 101 checks the offer SDP included in the INVITE message, and if the SDP describes media information that is compatible with the image communication apparatus 101, the image communication apparatus 101 transmits a 200 OK message. The 200 OK message includes an SDP that describes media information that is to be accepted by the image communication apparatus 101 and a reception port number. According to the present embodiment, by describing m=image 9000 TCP, the SDP unit that the image communication apparatus 101 agrees to establishing the SIP session for performing data communication in which the media type is "image" and in which the TCP port number 9000 is used as a reception port.

In S606, upon receiving the 200 OK message, the image communication apparatus 102 transmits an ACK message indicating that the image communication apparatus 102 has received the 200 OK message. This establishes the SIP session for realizing data communication of the media information agreed by the two parties between the image communication apparatus 102 and the image communication apparatus 101.

Returning to the description of FIG. 5, when a SIP session is established for data communication of the media type "image" (No in S503) as in the above described sequence 610, facsimile communication (image communication) by the digital facsimile protocol according to the T.38 standard is enabled. Accordingly, in S504, the CPU 201 receives a facsimile signal in accordance with the T.38 standard. Here, the facsimile signal according to the T.38 standard that is received by the incoming call terminal is stored in the RAM 203 through the network I/F control unit 215 under the control of the CPU 201, and after decoding processing is performed thereon by the CODEC 207, the resulting data is stored as compressed image data in the HDD 214. Further, the compressed image data is read out from the HDD 214 and subjected to expansion processing by the compression processing unit 206, and thereafter the expanded image data is output to the printer 213 through the printer I/F control unit 212 to thereby end the facsimile reception according to the T.38 standard.

On the other hand, when a SIP session is established for data communication of the media type "audio" (Yes in S503) as in the above described sequence 600, a telephone call that is based on voice (voice communication) or a facsimile communication by a VoIP method in accordance with the T.30 facsimile protocol in which facsimile signals are transmitted and received as deemed voice is enabled. In this case, an automatic reception operation (FAX/TEL switching operation) is performed that, by detecting the presence/absence of a CNG signal, automatically distinguishes whether a reception signal (digital signal) at an incoming call terminal is a voice signal for a telephone call or a facsimile signal that is received as deemed voice.

First, in S505, the CPU 201 controls so as to make a call connection that fakes the reception signal as a voice signal at the incoming call terminal and start automatic reception thereof. Therefore, under the control of the CPU 201, the reception signal is stored in the RAM 203 through the network I/F control unit 215, and is supplied to the voice processing unit 302 through the interface conversion unit 305 of the PCM processing unit 208.

However, the reception signal is simultaneously supplied to the modem processing unit 301 through the interface conversion unit 304 of the PCM processing unit 208, and in S506 the CPU 201 detects the presence or absence of a CNG signal to determine if the reception signal is a facsimile communication received as deemed voice. The reason for supplying the reception signal to the voice processing unit 302 and the modem processing unit 301 is that the CNG detection processing is included in the functions of the modem processing unit 301. That is, since it is necessary for the modem processing unit 301 to eavesdrop on data that is received by the voice processing unit 302 in order to perform a FAX/TEL switching operation, the same reception signal is supplied to the voice processing unit 302 and the modem processing unit 301.

As described above using FIG. 3, the PCM interface 307 supplies a timing signal that is used at the PCM interface 306 to the devices at both ends of the PCM interface, and transfers data signals in a manner that takes both devices as a slave. Therefore, since the PCM interfaces 306 and 307 operate in synchrony using the same timing signal, in the case of transferring the same reception signal, the reception signal can be transferred to the modem processing unit 301 and the voice processing unit 302 without giving particular consideration to the timing.

If the modem processing unit 301 detects a CNG signal (Yes in S507), the CPU 201 proceeds to S508. In S508, because the reception signal is a facsimile communication that is received as deemed voice, the CPU 201 selects modem processing by the modem processing unit 301. Next, in S509, the CPU 201 performs processing for facsimile reception based on the T.30 facsimile protocol, and thereafter ends the processing.

In contrast, if the modem processing unit 301 does not detect a CNG signal (No in S507), the CPU 201 proceeds to S510. In S510, the CPU 201 selects voice processing by the voice processing unit 302. Next, in S511, the CPU 201 performs a voice call by means of the voice input/output unit 303, and thereafter ends the processing.

In the present embodiment, reception data is eavesdropped on to perform a FAX/TEL switching operation, and the reception signal is supplied to each of the modem processing unit 301 and the voice processing unit 302 through the interface conversion units 304 and 305, respectively. However, the present invention is not limited thereto, and in a case of performing eavesdropping at the modem processing unit 301 it is also possible to supply a reception signal that is supplied to the voice processing unit 302 to the modem processing unit 301 by performing switching control inside the PCM processing unit 208.

<Modification>

Next, a modification of the PCM processing unit 208 is described with reference to FIG. 7. A PCM processing unit 700 illustrated in FIG. 7 differs from the configuration illustrated in FIG. 3 in that a data switching unit 701 is provided therein. The data switching unit 701 is capable of selecting, under the control of the CPU 201, whether to supply a reception signal to the modem processing unit 301 from the interface conversion unit (first interface conversion unit) 304 or the interface conversion unit (second interface conversion unit) 305. In the case of performing eavesdropping at the modem processing unit 301, the reception signal is supplied from the interface conversion unit 305, whereas in other cases the reception signal is supplied from the interface conversion unit 304.

Figure 7:
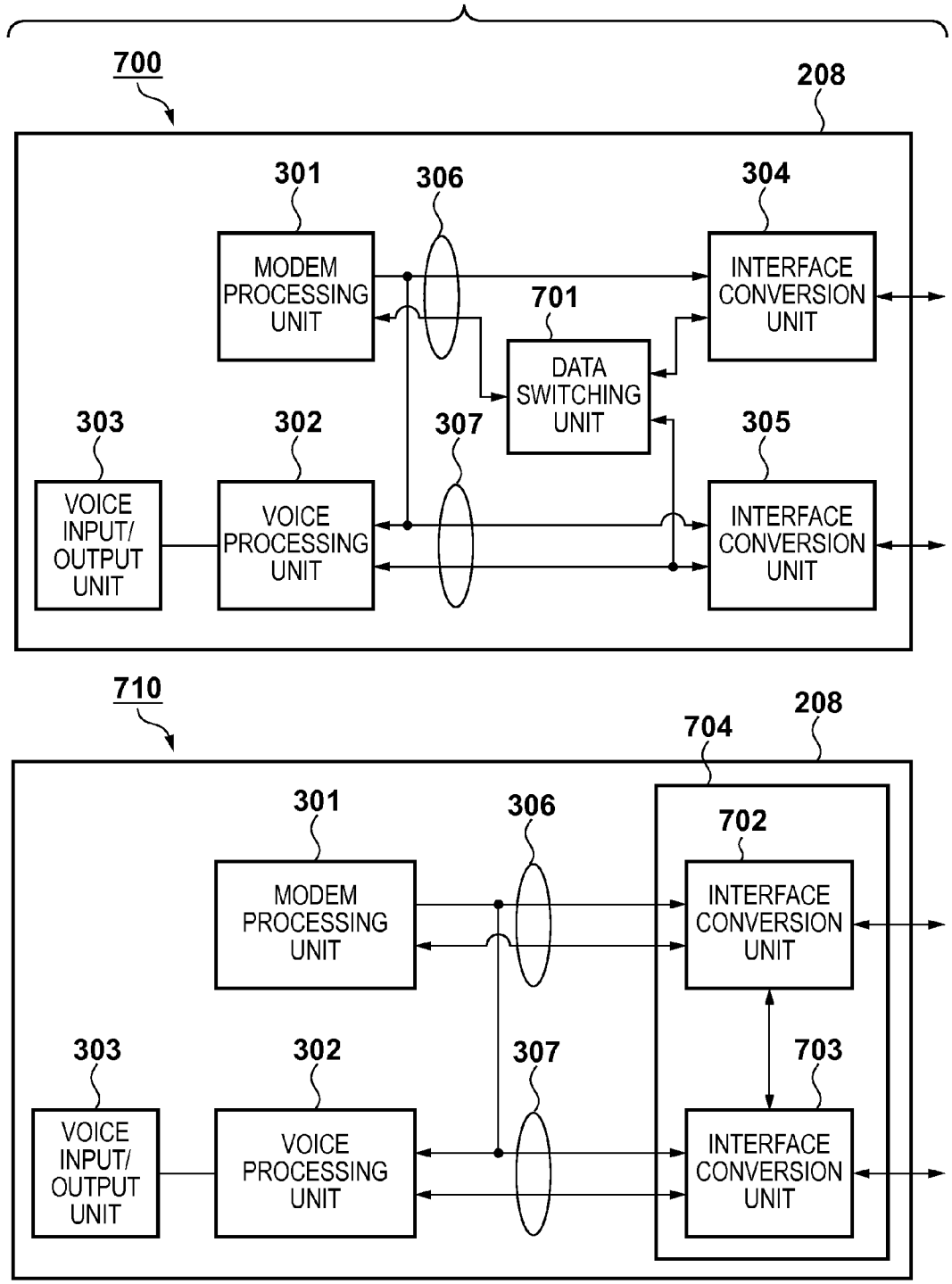
FIG. 7 is another detailed block diagram of a PCM processing unit according to a modification of the embodiment.

A PCM processing unit 710 illustrated in FIG. 7 differs from the configuration in FIG. 3 in that an interface conversion unit (first interface conversion unit) 702 and an interface conversion unit (second interface conversion unit) 703 are configured on the same circuit as a common device 704. The common device 704 is capable of selecting, under the control of the CPU 201, which of the interface conversion units 702 and 703 a reception signal is to be supplied to the modem processing unit 301 from. In the case of performing eavesdropping at the modem processing unit 301, the reception signal is supplied from the interface conversion unit 703 through the common device 704, whereas in other cases the reception signal is supplied by the interface conversion unit 702. That is, a digital signal that is output from the interface conversion unit 702 or a digital signal that is output, from the interface conversion unit 703 can be supplied to the modem processing unit 301.

In FIG. 7 also, the PCM interface 307 supplies a timing signal that is used at the PCM interface 306 to the devices at both ends of the PCM interface, and transfers data signals in a manner that takes both devices as a slave. Therefore, since the PCM interfaces 306 and 307 operate in synchrony using the same timing signal, in the case of transferring the same reception signal, the reception signal can be transferred to the modem processing unit 301 and the voice processing unit 302 without giving particular consideration to the timing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-134204 filed on Jun. 26, 2013, which is hereby incorporated by reference herein in its entirety.

What is claimed is:

1. A signal processing unit configured to process a digital signal having a voice bandwidth, comprising:
   a modem processing unit configured to process an image signal;
   a voice processing unit configured to process a voice signal;
   a first interface conversion unit that is connected to said modem processing unit through a first synchronous serial interface, and is configured to make a system bus and said first synchronous serial interface to said modem processing unit compatible with each other; and
   a second interface conversion unit that is connected to said voice processing unit through a second synchronous serial interface, and is configured to make a system bus and said second synchronous serial interface to said voice processing unit compatible with each other;
   wherein:
   said first synchronous serial interface performs a data transfer by adopting said modem processing unit that is connected to one end thereof as a master and adopting said first interface conversion unit that is connected to another end thereof as a slave; and
   said second synchronous serial interface adopts both of said voice processing unit and said second interface conversion unit that are connected to one end and another end thereof as a slave, and performs a data transfer between the two slaves at a transfer timing that is identical to a transfer timing of the master.

2. The signal processing unit according to claim 1, further comprising a data switching unit that has one end connected to said modem processing unit through said first synchronous serial interface and has another end connected to said first and second interface conversion unit, and that is configured to switchingly supply the digital signal that is output from said first interface conversion unit or the digital signal that is output from said second interface conversion unit to said modem processing unit.

3. The signal processing unit according to claim 1, wherein said first and second interface conversion unit are provided on an identical circuit as a common device, and are configured to supply, to said modem processing unit, the digital signal that is output from said first interface conversion unit or the digital signal that is output from said second interface conversion unit.

4. The signal processing unit according to claim 1, wherein said first and second interface conversion unit are configured to perform interface conversion with respect to a UART asynchronous serial transfer.

5. The signal processing unit according to claim 1, wherein said first and second synchronous serial interfaces are PCM interfaces configured to transfer PCM (Pulse Code Modulation) data.

6. An image communication apparatus, comprising:
   a reception unit configured to receive a digital signal having a voice bandwidth from an external apparatus that is capable of communicating through a network; and
   a signal processing unit configured to process the digital signal that is received by said reception unit, the signal processing unit including:
   a modem processing unit configured to process an image signal;
   a voice processing unit configured to process a voice signal;
   a first interface conversion unit that is connected to said modem processing unit through a first synchronous serial interface, and is configured to make a system bus and said first synchronous serial interface to said modem processing unit compatible with each other; and
   a second interface conversion unit that is connected to said voice processing unit through a second synchronous serial interface, and is configured to make a system bus and said second synchronous serial interface to said voice processing unit compatible with each other;
   wherein:
   said first synchronous serial interface performs a data transfer by adopting said modem processing unit that is connected to one end thereof as a master and adopting said first interface conversion unit that is connected to another end thereof as a slave; and
   said second synchronous serial interface adopts both of said voice processing unit and said second interface conversion unit that are connected to one end and another end thereof as a slave, and performs a data transfer between the two slaves at a transfer timing that is identical to a transfer timing of the master.

7. The image communication apparatus according to claim 6, wherein said signal processing unit is configured to:
   supply the digital signal at a same timing to said voice processing unit and said modem processing unit,
   determine whether or not the digital signal includes a CNG signal by means of said modem processing unit,
   cause the digital signal to be processed by said modem processing unit if it is determined that the digital signal includes the CNG signal, and
   cause the digital signal to be processed by said voice processing unit if it is determined that the digital signal does not include the CNG signal.

8. The image communication apparatus according to claim 7, wherein:
   if it is determined that the digital signal includes the CNG signal, the image communication apparatus determines that the digital signal is a facsimile signal that is received as deemed voice, and facsimile reception according to the T.30 standard is executed by said modem processing unit; and
   if it is determined that the digital signal does not include the CNG signal, the image communication apparatus determines that the digital signal is a voice signal, and a voice call is executed by said voice processing unit.

* * * * *